F. A. R. WRIGHT.
PROCESS FOR THE PREPARATION OF SECONDARY BATTERY PLATES.
APPLICATION FILED MAR. 27, 1909.
956,919.
Patented May 3, 1910.
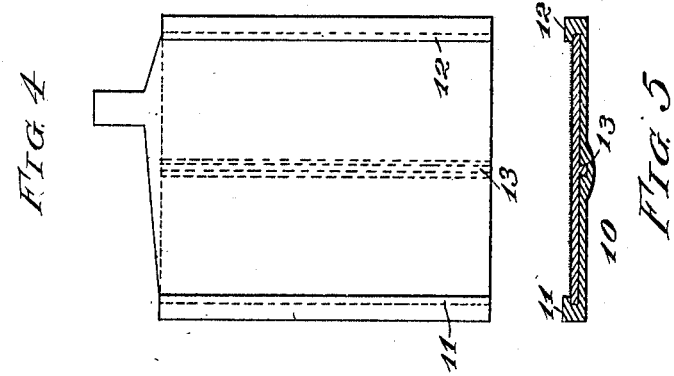
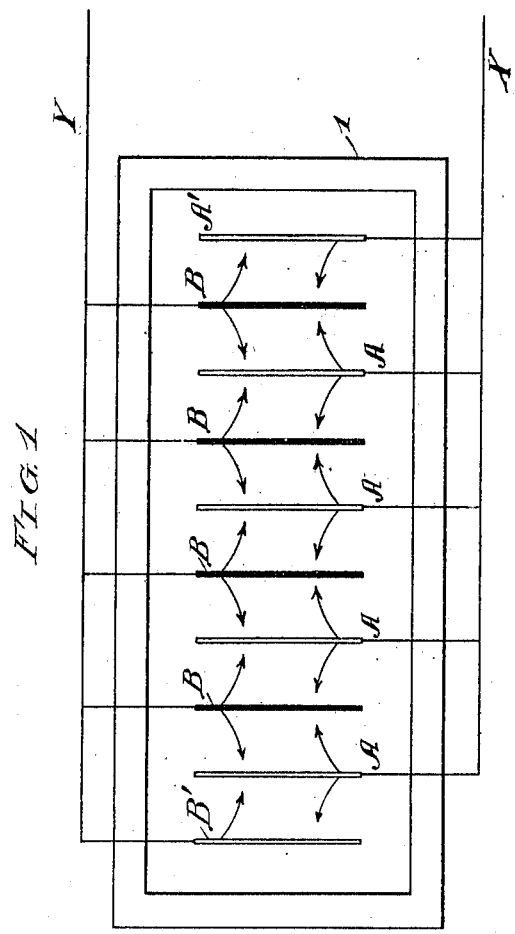
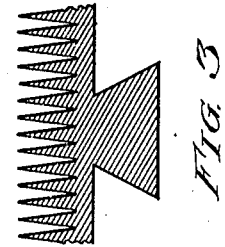
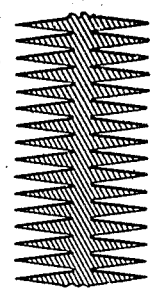
WITNESSES:
INVENTOR,
Frank A. R. Wright,
BY Bates, Jones & Hull
ATTYS.

UNITED STATES PATENT OFFICE.

FRANK A. R. WRIGHT, OF CLEVELAND, OHIO.

PROCESS FOR THE PREPARATION OF SECONDARY-BATTERY PLATES.

956,919.  Specification of Letters Patent.  Patented May 3, 1910.

Application filed March 27, 1909. Serial No. 486,132.

*To all whom it may concern:*

Be it known that I, FRANK A. R. WRIGHT, a citizen of the United States, residing at Cleveland, in the county of Cuyahoga and State of Ohio, have invented a certain new and useful Improvement in Processes for the Preparation of Secondary-Battery Plates, of which the following is a full, clear, and exact description, reference being had to the accompanying drawings.

My invention relates to a process for the preparation of secondary battery plates and provides a process whereby both peroxid and spongy lead plates are prepared, in the same tank and practically simultaneously upon a reversal of the current which is used for the forming.

Generally speaking, my invention comprises the various steps set forth in the accompanying claims.

Reference should be had to the accompanying drawings forming a part of this specification, in which—

Figure 1 is a diagrammatic representation of a forming tank provided with a series of plates to be prepared; Fig. 2 is a cross section of a portion of a plate, being shown on an enlarged scale for the purpose of clear illustration; Fig. 3 is a cross section of a portion of a half plate, likewise shown on an enlarged scale; Fig. 4 is an elevation of a support for a half plate showing such half plate therein; and Fig. 5 is a central longitudinal section of the support shown in Fig. 4.

Heretofore it has been the custom in the process of preparing secondary battery plates to employ at least two distinct sets of tanks in the forming of peroxid or positive plates and the spongy lead plates or negatives. This has necessitated the employment of a large number of tanks, also requiring considerable number of persons for properly looking after the tanks and plates during the forming process.

In carrying out my process, both negatives and positives are formed in the same tank, which reduces the number of tanks required to produce a given number of plates and likewise reduces the number of operators necessary to attend the tanks during the forming operation.

In Fig. 1 a tank of appropriate size is shown at 1. Such tanks are old and well known in the art and no specific description of the same is necessary. Within the tank 1 is suitably mounted and supported a series of plates A all of which are in electrical connection with a lead wire X which is suitably connected with a dynamo or other source of electric energy. A second series of plates B is likewise mounted within the tank and interspersed between consecutive plates A. These plates B are suitably connected with an electrical conductor Y which is connected with the same source of electric energy as the lead wire X. It will be observed that the plates A and the plates B are connected in parallel with their respective lead wires. The plates A and B are of the form shown in Fig. 2, namely, being formed upon their opposite faces with a series of vertical ribs which are triangular in form, the showing in Fig. 2 being on a greatly enlarged scale for the purpose of clearly showing the formation.

Outside of the plate B is mounted a plate A′ which may be either a half plate such as shown in Fig. 3 or what is known among workers in this art as a dummy, that is to say, a plate which is used simply for the purpose of forming the plate or plates to which it is adjacent, the dummy itself never being completely prepared to become a part of a secondary cell. However, I prefer in carrying out my process to use half plates, and therefore in the description of this process the plate A′ will be considered as a half plate. In case it is desired to use dummies as above described, the plate A′ will be out of electrical connection with the lead wire X, during the first part of the process, inasmuch as the plate A′ under such circumstances would only be of use for the purpose of building up the last plate during the second step of the process. However, if the plate A′ be a half plate, the plate will then be in electrical connection with the lead wire X during the entire process. In case it be desired to form the plate A adjacent the plate B′ as a whole plate, a dummy B′ is put in electrical connection with the wire Y. However, if the plate A above mentioned be a half plate, there is no necessity to employ any dummy B′.

Within the tank is placed a suitable quantity of some electrolyte such as sulfuric acid, which is of the proper density for the correct working of the process. The preparation of the sulfuric acid bath for this purpose is well known in the art and forms no part of this invention. To the sulfuric acid bath is added a quantity of some chemical substance the electrolysis of which, in connection with the electrolyte above mentioned will cause lead peroxid to be formed upon the anode plates. There are a variety of substances which might be used, among them being nitric acid, which is the chemical I preferably employ. Where nitric acid is the oxidizing agent used I proportion the bath about as follows: water 74 parts, sulfuric acid 25 parts and nitric acid 1 part. A suitable bath of sulfuric acid and nitric acid having been placed within the tank 1, an electric current is allowed to flow through the wire X as a positive wire and return to the source of electric energy through the lead wire Y. During this operation, the electric current will flow from the plates A and from the plate A' as anodes to the plates B and the dummy B' as cathodes and in the process of its passage electrolyzing the nitric acid and forming upon the plates A and A' lead peroxid, the lead peroxid being formed between the ribs upon the plates. This process is allowed to continue for several hours by renewing the oxidizing electrolyte from time to time until the desired and required amount of lead peroxid has been deposited upon the plates A and A'. When such has been accomplished, the current is reversed, so that the conductor Y now becomes a positive current feed wire and the lead wire X becomes the return path of the current and the plates B become anodes while the plates A become cathodes, it being understood that the bath within the tank 1 is renewed to bring it up to the required strength for the purpose of carrying on the forming operation. Under such conditions, the current will flow within the tank from the plates B and B' to the plates A and A', reducing the lead peroxid which has previously been formed upon these plates, so that the material between the ribs is spongy lead and at the same time forming between the ribs of the plates B and B' lead peroxid. This process is continued until all the lead peroxid previously formed upon the plates A has been reduced to spongy lead, at which time the process is complete and there are within the tank two series of plates, one series formed with peroxid, the other with spongy lead.

The time required for the formation of lead peroxid in the first instance as well as the time required in the second instance to reduce the lead peroxid and build up lead peroxid upon the anode plate when the current is reversed is not certainly fixed, varying with local conditions, the mechanical construction of the plate, that is to say, the form and number of ribs upon a plate of given surface area and also depending upon the particular oxidizing chemical substance used in addition to sulfuric acid in the bath. However, it may be stated that several hours' continuous running are required before the process is complete in both instances referred to above, the experienced manipulator judging from his experience rather than by a fixed rule.

Attention is called to the fact that in the process herein described, a single reversal of the current is all that is necessary in the complete working of the process; that is to say, when the current is first allowed to flow the anode plates will acquire a deposit of lead peroxid of sufficient amount so that when the current is reversed and the lead peroxid is reduced, there will be formed upon the finished plate the correct and necessary amount of spongy lead; and further when the current is reversed the current is allowed to flow in the reverse direction until sufficient lead peroxid is formed for the finished plate.

In Figs. 4 and 5 I have shown a form of backing which may be employed to support the half plate which comprises a body portion 10 having projecting portions 11 and 12 at the end thereof which are formed with undercut grooves. At the central portion of the member 10 an undercut groove 13 is formed which is adapted to engage with a similarly formed rib upon the back of the half plate. The backing member 10 may be formed of suitable material such as prepared wood from which all the organic acids have been removed, or it may be formed of vitreous substance,—the point being to form the member 10 of such material as will be unattacked by the chemical substances forming the bath.

It has been found by experience that the best results are obtained in carrying out my process by adding the nitric acid or other oxidizing electrolyte to the bath of sulfuric acid in successive doses and not at one time. Three doses have been found to give very satisfactory results.

When the plates are removed from the bath after the process is complete they are given a thorough washing to remove all of the traces of nitric acid or other chemical oxidizing substances in order that there may be no local action upon the plates when they are used in the finished battery.

It will be clear from the discussion given above that the process provided herein is very economical, in that it requires less tanks and less space for the formation of both positive and negative plates than that which was formerly employed.

Having thus described my invention, what I claim is:

1. The process of forming peroxid and spongy lead plates which consists in placing within a single tank having a suitable electrolyte therein two series of lead plates, the plates of each series being electrically connected with each other in parallel relation said electrolyte containing an oxidizing chemical substance in such quantity as to produce lead peroxid upon anode plates, sending a current through the plates and the electrolyte in one direction during which time one series of plates remains substantially unchanged while lead peroxid is deposited upon the other series of plates, then passing the current in the reverse direction through the plates and the electrolyte whereby the peroxid previously formed upon the one series of plates is completely reduced to spongy lead and the required amount of peroxid of lead is deposited upon the plates which were formerly unchanged.

2. The process of forming peroxid and spongy lead plates which consists in immersing a plurality of plates in a suitable electrolyte, sending a current of electricity through said plates and electrolyte in one direction, the electrolyte containing an oxidizing chemical substance in such amount that the cathode plates are unaffected when the current is passing through the plates, allowing the current to pass a sufficient length of time until the desired deposit of peroxid of lead is formed upon the anode plates, then reversing the passage of the current through said plates and electrolyte and allowing the current to pass a sufficient length of time to reduce the peroxid of lead previously formed to spongy lead and to build up peroxid of lead upon the plates previously unaffected.

3. The process of forming peroxid and spongy lead plates which consists in immersing a plurality of plates in an electrolyte, said electrolyte comprising sulfuric acid and an oxidizing chemical substance, sending a current of electricity through said plates and electrolyte in one direction and then reversing the direction of the current through said plates and the electrolyte, the oxidizing chemical being present in the electrolyte bath in such quantities, so that when the current is first allowed to pass lead peroxid will be formed upon the anode plates and when the current is reversed the peroxid of lead will likewise form upon the anode plates.

In testimony whereof, I hereunto affix my signature in the presence of two witnesses.

FRANK A. R. WRIGHT.

Witnesses:
CURT B. MUELLER,
BRENNAN B. WEST.